(12) United States Patent
Walton

(10) Patent No.: US 9,132,882 B2
(45) Date of Patent: Sep. 15, 2015

(54) MOTORBIKE STEERING AND SUSPENSION SYSTEM

(71) Applicant: Robert Christopher Walton, Oxford (GB)

(72) Inventor: Robert Christopher Walton, Oxford (GB)

(*) Notice: Subject to any disclaimer, the term of this patent is extended or adjusted under 35 U.S.C. 154(b) by 0 days.

(21) Appl. No.: 14/291,390

(22) Filed: May 30, 2014

(65) Prior Publication Data

US 2014/0361506 A1 Dec. 11, 2014

(30) Foreign Application Priority Data

Jun. 7, 2013 (GB) ................................. 1310130.8
Sep. 25, 2013 (GB) ................................. 1316989.7

(51) Int. Cl.
*B62D 61/02* (2006.01)
*B62K 25/16* (2006.01)
*B62K 21/18* (2006.01)
*B62L 1/00* (2006.01)

(52) U.S. Cl.
CPC ............... *B62K 25/16* (2013.01); *B62K 21/18* (2013.01); *B62L 1/005* (2013.01)

(58) Field of Classification Search
CPC .......... B62L 1/02; B62K 25/04; B62K 25/08; B62K 25/16; B62K 25/18; B62K 25/24; B62K 11/02

USPC ............ 280/276, 279, 11.233; 180/219
See application file for complete search history.

(56) References Cited

U.S. PATENT DOCUMENTS

| | | | | |
|---|---|---|---|---|
| 4,212,481 A * | 7/1980 | Ribi | ............................. | 280/276 |
| 4,401,316 A * | 8/1983 | Miyakoshi et al. | ........... | 280/277 |
| 5,431,426 A * | 7/1995 | Ijams et al. | ................... | 280/276 |
| 5,899,478 A * | 5/1999 | Woodside | ..................... | 280/276 |
| 5,931,487 A * | 8/1999 | Koppelberg et al. | .......... | 280/276 |
| 6,155,370 A * | 12/2000 | Iwai et al. | ..................... | 180/222 |
| 6,357,775 B1 * | 3/2002 | Iwai et al. | ..................... | 280/276 |
| 6,634,661 B1 * | 10/2003 | Huang | ....................... | 280/87.03 |

* cited by examiner

*Primary Examiner* — James English
(74) *Attorney, Agent, or Firm* — Davis & Bujold, P.L.L.C.; Jay S. Franklin

(57) ABSTRACT

A steering and suspension mechanism for a motorbike, scooter, bicycle, skateboard or other two wheeled, in-line, vehicle, incorporating a steering axis rake that is inclined to the vertical, in a direction that is upwards and forwards from the ground in the normal direction of travel, together with a trailing radial arm suspension, in combination. Steering may be effected via a push rod attached to the handlebars, which in turn pivot on the main chassis. A brake calliper may be pivoted on the wheel axle, with a link to the steering head assembly to prevent rotation of the calliper with the brake disc under braking. This link may be parallel or nearly parallel to the radial arm. The exact angle can be chosen to control 'dive' due to weight shift under braking.

4 Claims, 3 Drawing Sheets

MOTORBIKE STEERING AND SUSPENSION SYSTEM

This application claims priority from British patent application serial no. 1316986.7 filed Sep. 25, 2013, which claims priority from British patent application serial no. 1310130.8 filed Jun. 7, 2013.

FIELD OF THE INVENTION

The present invention is a steering and suspension mechanism for a motorbike, scooter, bicycle, skateboard or other two wheeled, in-line, vehicle.

BACKGROUND OF THE INVENTION

Conventional motorbikes, scooters, bicycles and in-line skateboards, incorporate a steering geometry with a rake and trail. That is, the axis about which the front wheel steers is inclined to the vertical (the rake) and meets the ground at a certain distance (the trail) ahead of the position where the wheel touches the ground. Together, these features strongly influence the stability of the machine. On conventional bikes the angle of the steering axis is inclined to the vertical, leaning upwards, and rearwards from the ground.

However, there are certain advantages in using a rake that is inclined forwards to the vertical. That is, the steering axis leans upwards and forwards from the ground, while still incorporating a trail as described above.

A 'forward' leaning rake like this is used extensively on in-line skate boards. A simple caster is typically used, which is inclined forwards to the vertical, creating the rake and trail described above. But these devices do not have trailing arm suspension, and do not have a steering linkage driven from handlebars. Nor do they possess anti-dive brakes as described below.

Likewise, trailing radial arm suspension is very common in all types of motor vehicle. A trailing radial arm is used to allow vertical suspension travel. The radial arm is connected to the wheel axle at one end, and to the remaining chassis at the other, via a horizontal pivot, the wheel axle being positioned behind (trailing) the radial arm pivot.

SUMMARY OF THE INVENTION

The present invention however incorporates a forward leaning rake angle together with a trailing radial arm in combination. These features, as well as other features described, are not novel in their own right. But when used together, in combination, they are novel, and give certain advantages over conventional steering and suspension systems.

Steering may be effected via a push rod linkage between the wheel assembly and the handlebars, which in turn pivot on the main chassis. A brake calliper may be pivoted on the wheel axle, with a link from the calliper to the steering head assembly to prevent rotation of the calliper with the brake disc under braking. This link may be parallel or nearly parallel to the radial arm. The exact angle can be chosen to control 'dive' due to weight shift during braking. Conventional shock absorbing suspension unit or units may be provided, joining the live end of the trailing radial arm to the steering head assembly.

This system has certain direct technical advantages: The use of a forward leaning rake allows a smaller trail to be used while maintaining neutral steering. In turn, a reduced trail produces simultaneously more responsive steering, while maintaining stability. For example, if the bike is stationary and upright, and the handlebars are turned fully to one side, they tend to straighten with the present invention, so directing the front wheel towards the direction of motion. This does not happen with a convention bike. With the present invention the steering and suspension mechanisms are separated. That is, different components are provided for suspension and steering functions, intended to improve feedback and control. Linear motion sliding joints, such as those in telescopic forks are avoided, and so therefore are the stick-friction effects associated with them. On a motorbike fitted with telescopic forks, there is a tendency for the front suspension to compress during braking (dive) due to weight shift. This lowers the front of the machine and alters the steering geometry, which unnecessarily uses up suspension travel, and alters the rake and trail, so altering the balance and stability of the machine as the brakes are applied. With the present invention, the braking system may be tuned to eliminate or reduce dive. This in turn allows softer suspension to be used, while keeping the machine more level during braking, and the steering geometry more constant.

There are other advantages that are indirectly possible with the use of this system. For example, at 100 miles per hour a vehicle needs about eight times more power than at 50 miles per hour to overcome aerodynamic drag. If the drag is reduced, not only can the vehicle increase its speed, but the fuel consumption may also be reduced. One way to reduce drag is to improve the shape, but another is to reduce the size, particularly the size as seen from the front. The present invention tends to allow the rider to use a lower ride height, by providing a more rearward location of the handlebars, so reducing the 'frontal area' (i.e. the area as seen from the front) of the combined rider and bike. Likewise, reducing weight, simultaneously increases the performance and reduces fuel consumption. This effect is more pronounced with the vehicle's wheels. In order to accelerate the mass of the wheels, power is consumed. But power is also used to make the wheels rotate progressively faster. To reduce weight, the wheel size may be reduced without compromising stability, as described above. The present invention arguably lends itself to the use of smaller wheels. The use of smaller wheels and lower ride height have the added advantages of respectively reducing unsprung weight and centre of gravity. The more rearward positioning of the handlebars that is possible with the present invention tends to allow a more feet forward riding position, which is safer than head first in the event of a frontal collision and lowers the centre of gravity. Superior stability, handling, and low centre of gravity, are all desirable for safety as well as performance. Arguably, the sitting position and ride height of a normal family car, which are easily achievable using the present steering and suspension system, is comfortable and provides adequate visibility for most road users.

BRIEF DESCRIPTION OF THE DRAWINGS

The invention will now be described solely by way of example and with reference to the accompanying drawings in which.

DETAILED DESCRIPTION OF THE PREFERRED EMBODIMENTS

Figure 1:
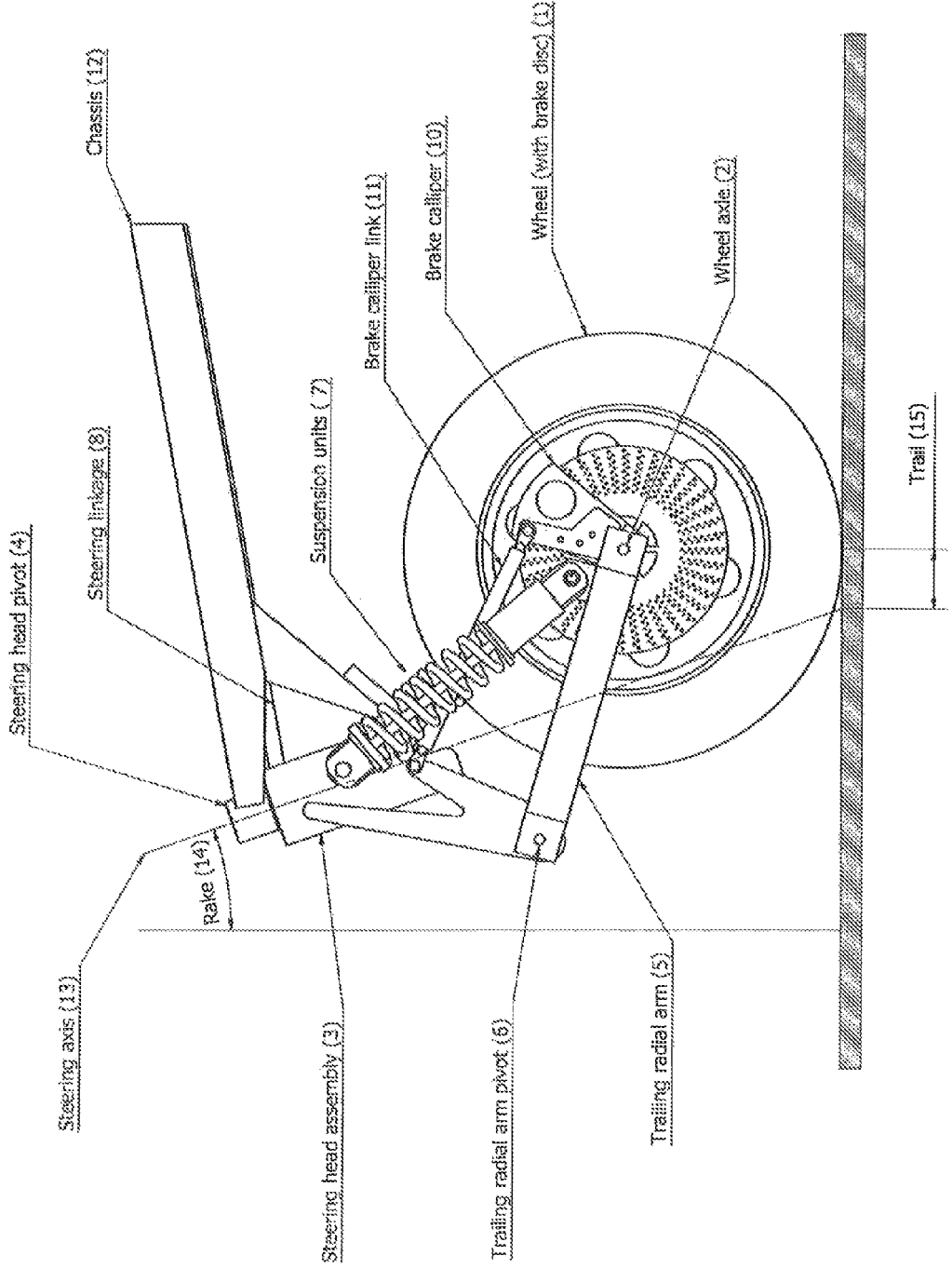
FIG. 1: is a plan view of a front wheel assembly of a steering and suspension system according to the invention.
Figure 2:
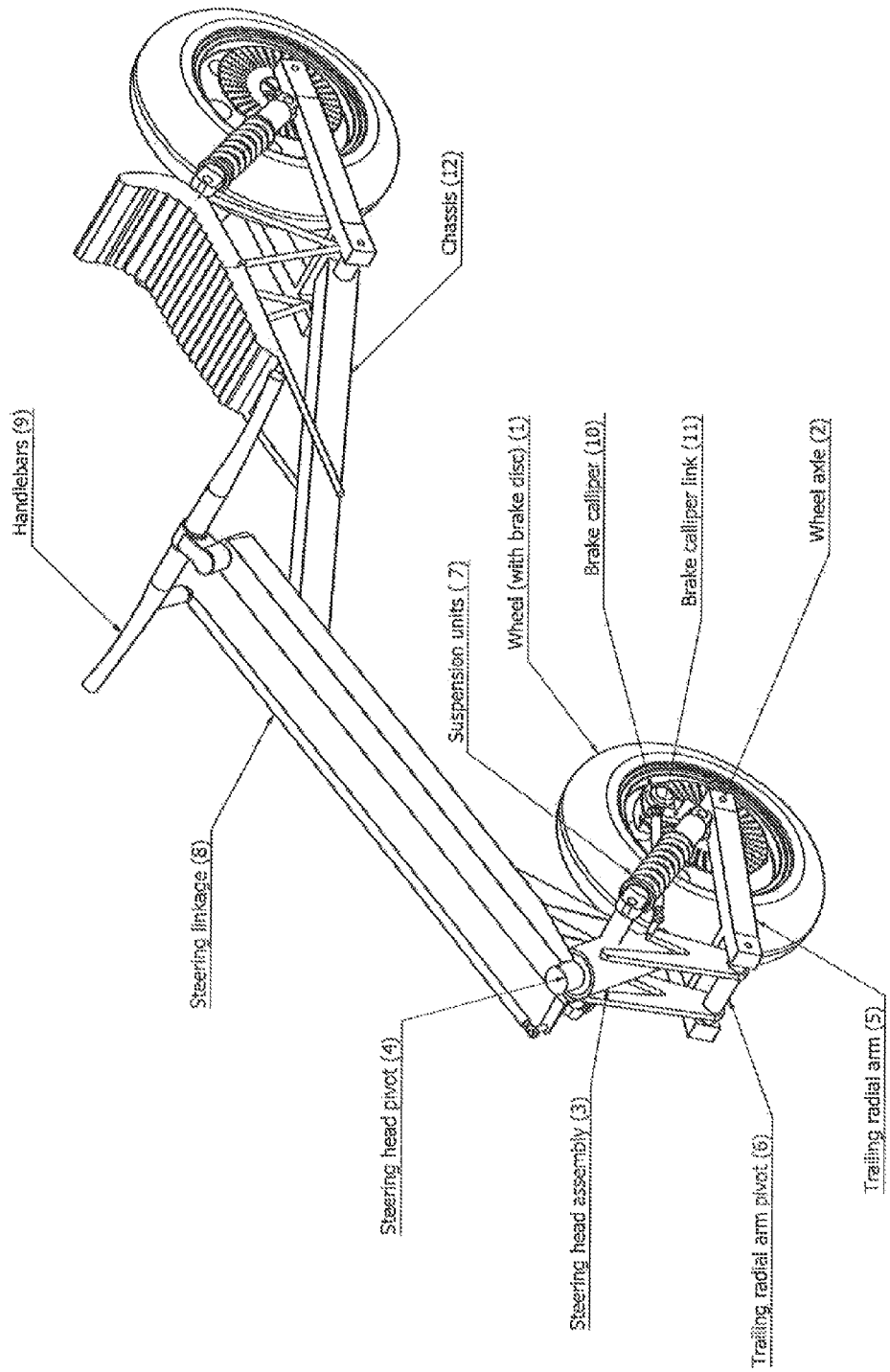
FIG. 2: is a perspective view of a rolling chassis having the steering and suspension system according to the invention.
Figure 3:
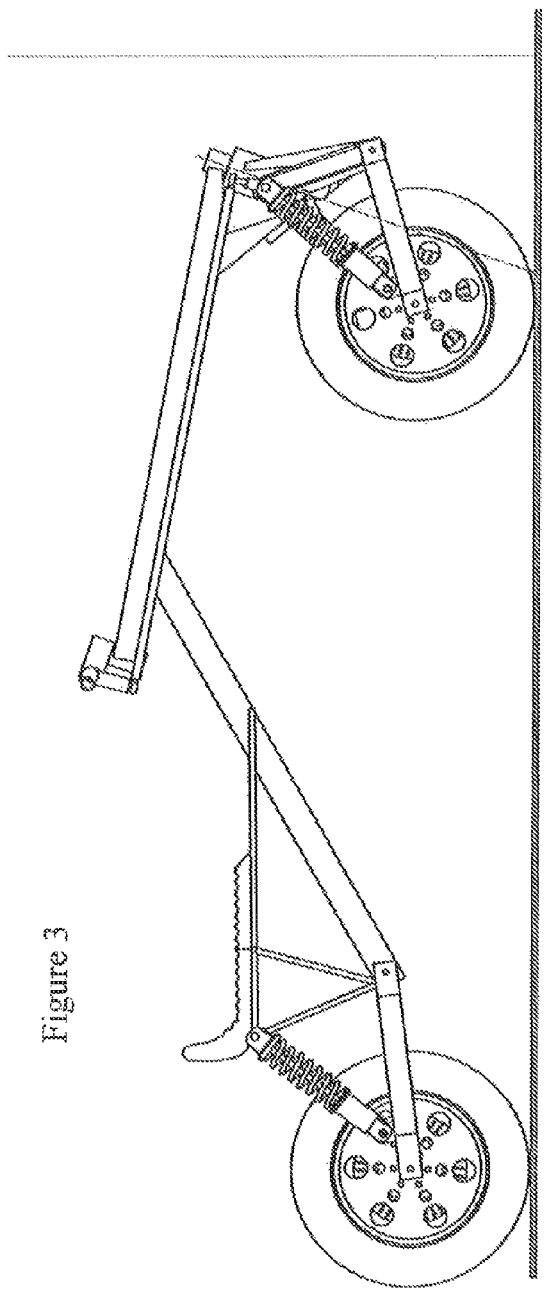
FIG. 3: is a side plane view of the rolling chassis having the steering and suspension system according to the invention.
Figure 4:
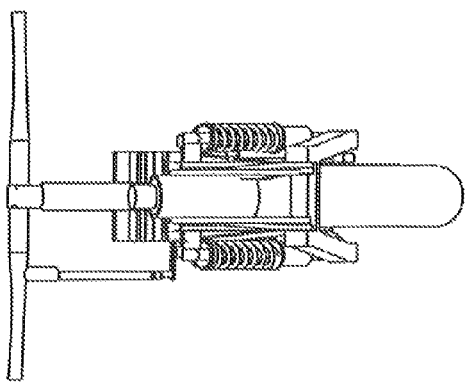
FIG. 4: is a front plan view of the rolling chassis having the steering and suspension system according to the invention.
Figure 5:
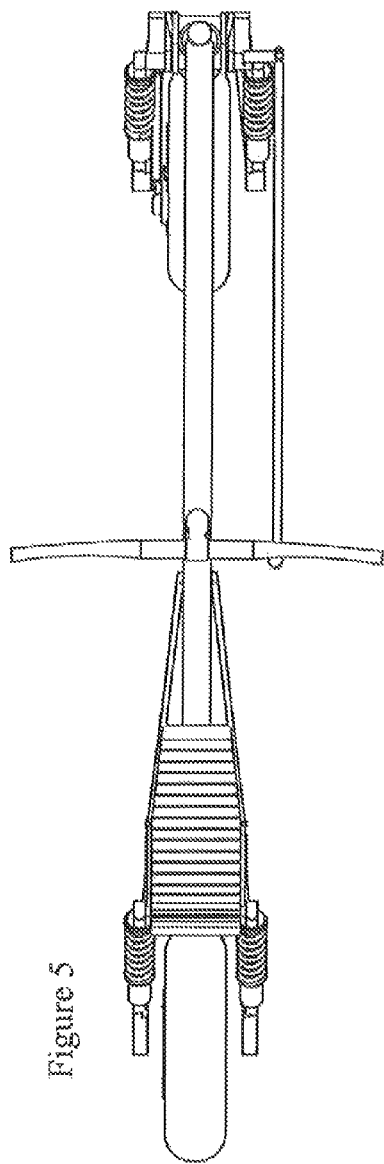
FIG. 5: is a top view of the rolling chassis having the steering and suspension system according to the invention.

The figures show a steering and suspension system comprising front wheel assembly comprising a wheel with brake disc 1, a steering head assembly 3, a steering head pivot 4, a trailing radial arm 5, a pivot joint 6, suspension units 7, a steering linkage 8, handlebars 9, a brake calliper 10, a brake calliper link 11 and a chassis 12.

The trailing radial arm 5 is connected to the wheel axle 2 at one end and to the steering head assembly 3 at the other end. The trailing radial arm 5 and the steering head assembly 3 are joined by an approximately horizontal, pivot joint 6. The steering head assembly 3 is connected to the motorbike chassis 12 at the steering head pivot 4 which acts as an inclined pivot joint. The inclined pivot joint defines the angle or rake and position of the steering axis 13. The rake 14 and trail 15 are in turn defined by the geometry of the above components. The suspension units 7 are fitted between the live end of the radial arm 5 and the steering head assembly 3. The rake 14, as known in the art and shown in FIG. 1, is the angle at which the steering axis 13 is inclined when compared against a vertical line drawn perpendicular to the ground. The trail 15, as known in the art and shown in FIG. 1, is the distance on the ground between a vertical line drawn perpendicular to the ground and passing through the wheel axle 2 and the steering axis 13.

Undulations in the road surface cause the wheel 1 to rise and fall, so causing the radial arm 5 to articulate about pivot joint 6 which then causes compression of the suspension units 7. Steering is facilitated by turning the handlebars 9 which moves the steering linkage 8 and in turn causes the whole suspension assembly, complete with wheel 1, to turn about the steering axis 13. The steering axis 13 is inclined to the vertical in a direction that is upwards and forwards relative to a straight forward direction of travel.

The invention claimed is:

1. A steering and suspension mechanism for a motorbike, a scooter, a bicycle, a skateboard or an other two wheeled, in-line, vehicle, the steering and suspension mechanism comprising:

a wheel with a brake disc (1), a wheel axle (2), a steering head assembly (3), a steering head pivot (4), a trailing radial arm (5), an approximately horizontal radial arm pivot joint (6), suspension units (7), a steering linkage (8), handlebars (9), a brake calliper (10), a brake calliper link (11) and a main chassis (12), wherein, a first end of the trailing radial arm (5) is connected to the wheel axle (2) and a second end of the trailing radial arm is connected to the steering head assembly (3), the wheel and the brake disc (1) rotate about the wheel axle (2), the trailing radial arm (5) and the steering head assembly (3) are joined by the approximately horizontal radial arm pivot joint (6), the steering head assembly (3) is connected to the main chassis (12) at the steering head pivot (4) which acts as an inclined pivoting joint and defines a rake and position of a steering axis (13), the rake (14) and a trail (15) are in turn defined by a geometry of the above components;

the said steering head pivot (4) defines the steering axis (13) and the trail (15) about which the wheel with brake disc steers and that is inclined to a vertical leaning in a direction, relative to a straight forward direction of travel, that is forward and upward from the ground together with the trailing radial arm in combination.

2. The steering and suspension mechanism of claim 1, wherein steering is effected via the steering linkage (8) attached to the handlebars (9) which in turn pivot on the main chassis (12).

3. The steering and suspension mechanism of claim 1 wherein the brake calliper (10) is pivoted on the wheel axle (2) and the brake calliper link (11) connects the brake calliper (10) to the steering head assembly (3) to prevent rotation of the brake calliper with the brake disc under braking said brake camper link being either parallel or nearly parallel to the trailing radial arm (5), the rake affecting 'dive' due to weight shift during braking.

4. The steering and suspension mechanism of claim 1, wherein the suspension units (7) are provided between the trailing radial arm (5) and the steering head assembly (3).

\* \* \* \* \*